(12) United States Patent
Kojima et al.

(10) Patent No.: US 11,416,169 B2
(45) Date of Patent: Aug. 16, 2022

(54) MEMORY SYSTEM AND METHOD OF CONTROLLING NONVOLATILE MEMORY

(71) Applicant: Kioxia Corporation, Tokyo (JP)

(72) Inventors: Yoshihisa Kojima, Kawasaki (JP); Riki Suzuki, Yokohama (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 17/199,586

(22) Filed: Mar. 12, 2021

(65) Prior Publication Data

US 2022/0083264 A1    Mar. 17, 2022

(30) Foreign Application Priority Data

Sep. 14, 2020  (JP) .............................. JP2020-153868

(51) Int. Cl.
*G06F 3/00* (2006.01)
*G06F 3/06* (2006.01)
*G06F 12/06* (2006.01)

(52) U.S. Cl.
CPC .......... *G06F 3/0656* (2013.01); *G06F 3/0604* (2013.01); *G06F 3/0679* (2013.01); *G06F 12/06* (2013.01); *G06F 2212/7201* (2013.01)

(58) Field of Classification Search
None
See application file for complete search history.

(56) References Cited

U.S. PATENT DOCUMENTS

| 8,250,087 | B2  | 8/2012 | Eshita |
| 9,436,480 | B1* | 9/2016 | Lin .................. G06F 3/061 |
| 10,289,308 | B2 | 5/2019 | Velez-McCaskey |
| 2015/0220275 | A1 | 8/2015 | Oh et al. |

FOREIGN PATENT DOCUMENTS

JP             2010-182254 A       8/2010

* cited by examiner

*Primary Examiner* — Midys Rojas
(74) *Attorney, Agent, or Firm* — Oblon, McClelland, Maier & Neustadt, L.L.P.

(57) ABSTRACT

A memory system includes a controller that transmits, to a memory chip, one first command set indicating a head of a third storage area being one of second storage areas, in a case where first data is read to a first buffer of the memory chip. The first data includes a plurality of first data segments having been stored in the second storage areas. The memory chip includes circuitry that outputs a second data segment and a third data segment to the controller in a period after the controller transmits the first command set to the memory chip before the controller transmits a second command set to the memory chip. The second data segment is a data segment having been stored in the third storage area. The third data segment is a data segment having been stored in a fourth storage area different from the third storage area.

20 Claims, 16 Drawing Sheets

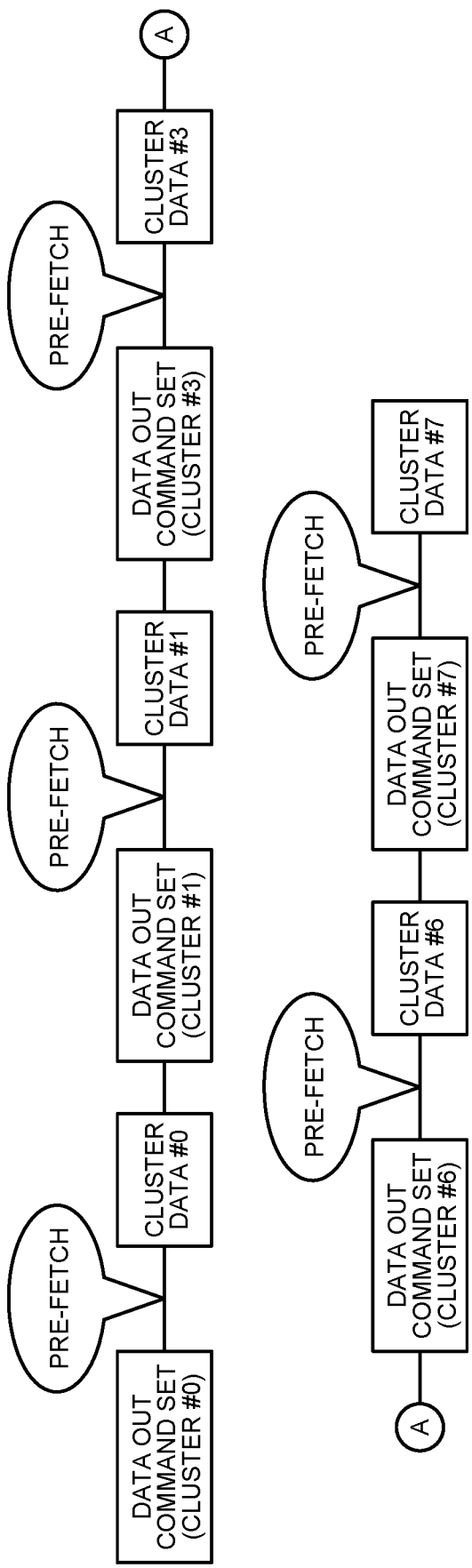

MEMORY SYSTEM AND METHOD OF CONTROLLING NONVOLATILE MEMORY

CROSS-REFERENCE TO RELATED APPLICATIONS

This application is based upon and claims the benefit of priority from Japanese Patent Application No. 2020-153868, filed on Sep. 14, 2020; the entire contents of which are incorporated herein by reference.

FIELD

Embodiments described herein relate generally to a memory system and a method of controlling a nonvolatile memory.

BACKGROUND

Memory systems are known, which incorporate a memory chip including a memory cell array and a controller that inputs and outputs data to and from the memory chip. There has been a request for such a memory system to increase a data transfer rate from the memory chip to the controller as much as possible.

BRIEF DESCRIPTION OF THE DRAWINGS

FIG. 16 is a schematic timing chart of a comparative example at the time of transferring cluster data illustrated in FIG. 6.

DETAILED DESCRIPTION

According to one embodiment, in general, a memory system includes a memory chip and a controller. The memory chip includes a memory cell array, a first buffer, and a circuitry. the memory cell array includes a first storage area that includes a plurality of second storage areas aligned with no gap. The circuitry is configured to read data from the memory cell array to the first buffer in a unit of the first storage area The controller is configured to: manage a relationship between a logical address and a physical address in a unit of the second storage area, the logical address being associated with data, the physical address indicating a location in the memory chip in which the data is stored, and in a case where first data is read from the first storage area to the first buffer, the first data having been stored in the first storage area and including a plurality of first data segments respectively having been stored in the plurality of second storage areas of the first storage area, transmit, to the memory chip, a first command set that includes first location information indicating a head of a third storage area, the third storage area being one of the plurality of second storage areas. The circuitry is further configured to, in a period after the controller transmits the first command set to the memory chip before the controller transmits a second command set next to the first command set to the memory chip, output, to the controller, a second data segment, the second data segment being one of the plurality of first data segments and having been stored in the third storage area, and a third data segment, the third data segment being one of the plurality of first data segments and having been stored in a fourth storage area, the fourth storage area being one of the plurality of second storage areas and different from the third storage area.

Hereinafter, a memory system according to embodiments will be described in detail with reference to the accompanying drawings. The embodiments are presented for illustrative purpose only and not intended to limit the scope or spirit of the present invention.

First Embodiment

Figure 1:
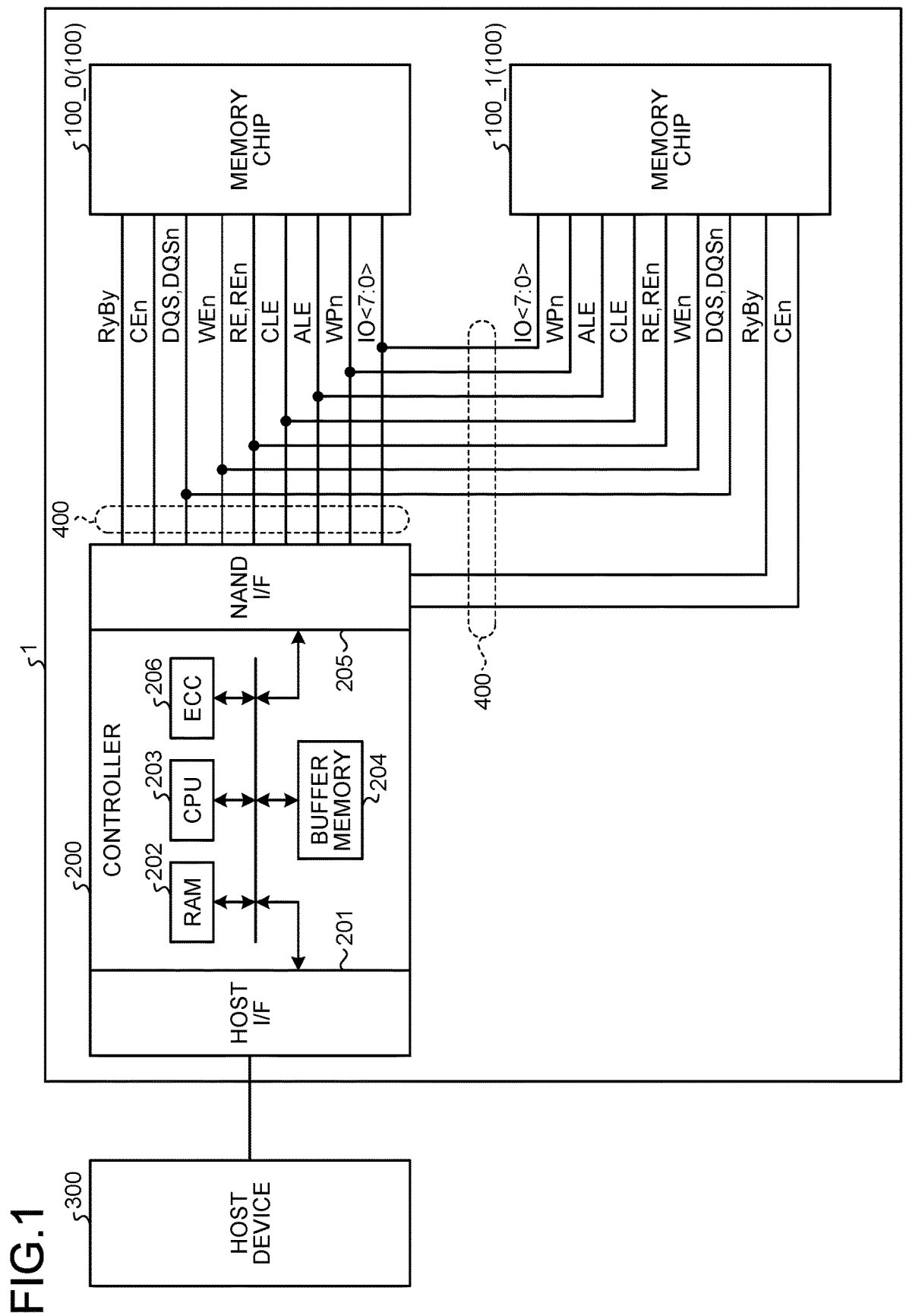
FIG. 1 is a diagram illustrating an exemplary configuration of a memory system of a first embodiment connected to a host device.

FIG. 1 is a diagram illustrating an exemplary configuration of a memory system of a first embodiment. As illustrated in FIG. 1, the memory system 1 is connectable to a host device 300. The host device 300 is, for example, an information processing device such as a server, a personal computer, or a mobile terminal. The memory system 1 functions as an external storage of the host device 300. The host device 300 can transmit access requests such as a read request or a write request to the memory system 1.

The memory system 1 includes one or more memory chips 100 and a controller 200. The memory chip 100 is, for example, a NAND type flash memory. The memory system 1 of the present embodiment includes memory chips 100_0 and 100_1 as one or more memory chips 100. The number of memory chips 100 included in the memory system 1 is not limited to two.

Each memory chip 100 includes a plurality of memory cell transistors and is capable of storing data in a nonvolatile manner. The memory chip 100 is connected to the controller 200 via a NAND bus 400. The memory chip 100 operates in accordance with a command from the controller 200. The memory chip 100 transmits and receives, for example, an 8-bit input/output signal IO<7:0> to and from the controller 200. A bit width of the input/output signal IO is not limited to eight bits. Examples of the input/output signal IO<7:0> include a command, an address, and data. In addition, the memory chip 100 receives a control signal from the controller 200 and transmits a status signal to the controller 200.

The control signal includes a chip enable signal CEn, a command latch enable signal CLE, an address latch enable signal ALE, a write enable signal WEn, a read enable signal pair RE and REn, a strobe signal pair DQS and DQSn, and a write protect signal WPn.

The chip enable signal CEn serves to place the memory chip 100 as an access target in an enabled state. The signals IO<7:0>, DQS, DQSn, CLE, ALE, WEn, RE, REn, and WPn are input in common to the two memory chips 100_1 and 100_2. The chip enable signal CEn is individually input to the two memory chips 100_1 and 100_2. Either of the two memory chips 100_1 and 100_2, enabled by the chip enable signal CEn, can execute an operation in accordance with the signals IO<7:0>, DQS, DQSn, CLE, ALE, WEn, RE, REn, and WPn.

The strobe signal pair DQS and DQSn serves to instruct a transmission destination to fetch data transmitted through the input/output signal IO<7:0>. The strobe signal pair DQS and DQSn can be transmitted by either of the controller 200 and the memory chip 100, that is, by the one transmitting the input/output signal IO<7:0>. That is, the strobe signal pair DQS and DQSn can be transmitted from the controller 200 to the memory chip 100 or from the memory chip 100 to the controller 200.

The command latch enable signal CLE serves to indicate that the input/output signal IO<7:0> includes a command. The address latch enable signal ALE serves to indicate that the input/output signal IO<7:0> includes an address. The write enable signal WEn serves to instruct the memory chip 100 to fetch the command or the address transmitted through the input/output signal IO<7:0>. The read enable signal pair RE and REn serves to instruct the memory chip 100 to output the input/output signal IO<7:0>. The memory chip 100 may delay the input read enable signal pair RE and REn to output them as the strobe signal pair DQS and DQSn. The write protect signal WPn serves to instruct the memory chip 100 to prohibit execution of program operation and erase operation. The program operation and the erase operation will be described later.

The status signal indicates various statuses of the memory chip 100, and includes a ready busy signal RyBy. The ready busy signal RyBy serves to indicate whether the memory chip 100 is in a ready state (Ry) or in a busy state (By). In the ready state (Ry), the memory chip 100 can receive a command from the controller 200. In the busy state (By), the memory chip 100 cannot receive the command from the controller 200. The two memory chips 100_1 and 100_2 can transmit the ready busy signals RyBy to the controller 200 individually. The controller 200 can know a status of each memory chip 100 by receiving the status signal or the ready busy signal RyBy.

The controller 200 can instruct the memory chip 100 to perform various types of processing in response to requests from the host device 300.

The controller 200 includes a host interface (I/F) circuit 201, a random access memory (RAM) 202, a central processing unit (CPU) 203, a buffer memory 204, a NAND interface (I/F) circuit 205, and an error correction code (ECC) circuit 206. The controller 200 may be configured as, for example, a system-on-a-chip (SoC). The controller 200 may be configured as a field-programmable gate array (FPGA) or an application specific integrated circuit (ASIC). The controller 200 may include a plurality of chips. The functions of the controller 200 may be implemented by a processor executing software, dedicated hardware, or a combination thereof.

The host interface circuit 201 is connected to the host device 300 via a bus conforming to, for example, a serial advanced technology attachment (SATA) standard, a small computer system interface (SCSI) standard, a serial attached SCSI (SAS) standard, or a peripheral components interconnect (PCI) Express (registered trademark) standard. The host interface circuit 201 executes communication between the controller 200 and the host device 300.

The NAND interface circuit 205 is connected to each memory chip 100 via the NAND bus 400. The NAND interface circuit 205 executes communication between the controller 200 and the memory chip 100.

The CPU 203 controls the operation of the controller 200.

The CPU 203 uses the RAM 202 as a work area. The buffer memory 204 temporarily stores data to be transmitted to the memory chip 100 and data output from the memory chip 100. The RAM 202 and the buffer memory 204 may be a dynamic random access memory (DRAM), a static random access memory (SRAM), or a combination thereof. Types of the memories serving as the RAM 202 and the buffer memory 204 are not limited thereto.

The ECC circuit 206 encodes data to be transmitted to the memory chip 100, using an error correction code. In addition, the ECC circuit 206 receives and decodes encoded data from the memory chip 100 to detect and correct an error in the data.

Figure 2:
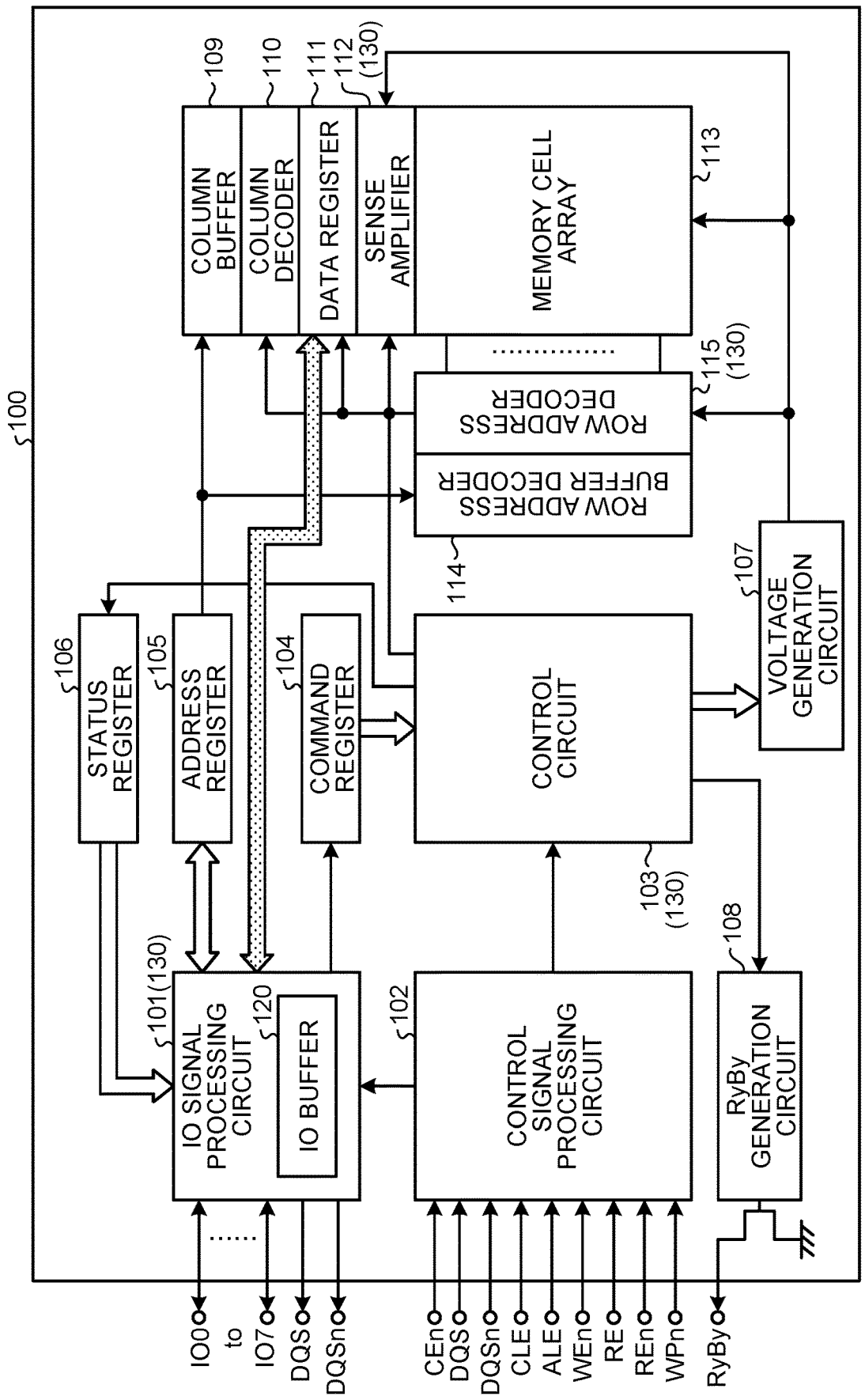
FIG. 2 is a diagram illustrating an exemplary configuration of a memory chip of the first embodiment.

FIG. 2 is a diagram illustrating an exemplary configuration of each memory chip 100 of the first embodiment.

The memory chip 100 includes an IO signal processing circuit 101, a control signal processing circuit 102, a control circuit 103, a command register 104, an address register 105, a status register 106, a voltage generation circuit 107, a RyBy generation circuit 108, a column buffer 109, a column decoder 110, a data register 111, a sense amplifier 112, a memory cell array 113, a row address buffer decoder 114, and a row address decoder 115.

The control signal processing circuit 102 receives the control signal. The control signal processing circuit 102 determines from the received control signal whether the input/output signal IO<7:0> sent to the IO signal processing circuit 101 is any of a command, an address, and data. The control signal processing circuit 102 notifies the IO signal processing circuit 101 of a result of the determination. In addition, the control signal processing circuit 102 transfers the received control signal to the control circuit 103. The control signal processing circuit 102 causes the IO signal processing circuit 101 to fetch the input/output signal IO<7:0> at timing at which the strobe signal pair DQS and DQSn is toggled by the controller 200.

The IO signal processing circuit 101 includes an IO buffer 120. The IO buffer 120 serves as a buffer circuit that transmits and receives the input/output signal IO<7:0> to and from the controller 200. The IO signal processing circuit 101 receives data transmitted through the input/output signal IO<7:0> in the IO buffer 120. The IO signal processing circuit 101 fetches the data in the IO buffer 120 at the toggle timing of the strobe signal pair DQS and DQSn in accordance with an instruction from the control signal processing circuit 102. The IO signal processing circuit 101 stores a command, an address, and data contained in the input/output signal IO<7:0> in the command register 104, the address register 105, and the data register 111, respectively.

The address stored in the address register 105 includes a row address and a column address. The row address is sent to the row address buffer decoder 114. The column address is sent to the column buffer 109.

The control circuit 103 serves as a state transition circuit i.e., a state machine that receives various control signals via the control signal processing circuit 102 and performs a state transition in accordance with the control signals. The control circuit 103 controls the operation of the memory chip 100 as a whole in accordance with various control signals and the command stored in the command register 104.

In addition, the control circuit 103 generates status information representing a status or a result of operation control, for example, and stores the status information in the status register 106. The control circuit 103 outputs the status information from the status register 106 via the IO signal processing circuit 101 in response to a status read command from the controller 200.

The RyBy generation circuit 108 allows the state of the ready busy signal RyBy to transition between the ready state (Ry) and the busy state (By) under the control of the control circuit 103.

The memory cell array 113 includes a plurality of memory cell transistors in the form of arrays. Each of the memory cell transistors is connected to a bit line BL and a word line WL. The memory cell array 113 stores data received from the host device 300, for example.

The memory cell array 113 includes a plurality of blocks BLK. All pieces of data stored in one block BLK are erased together.

Figure 3:
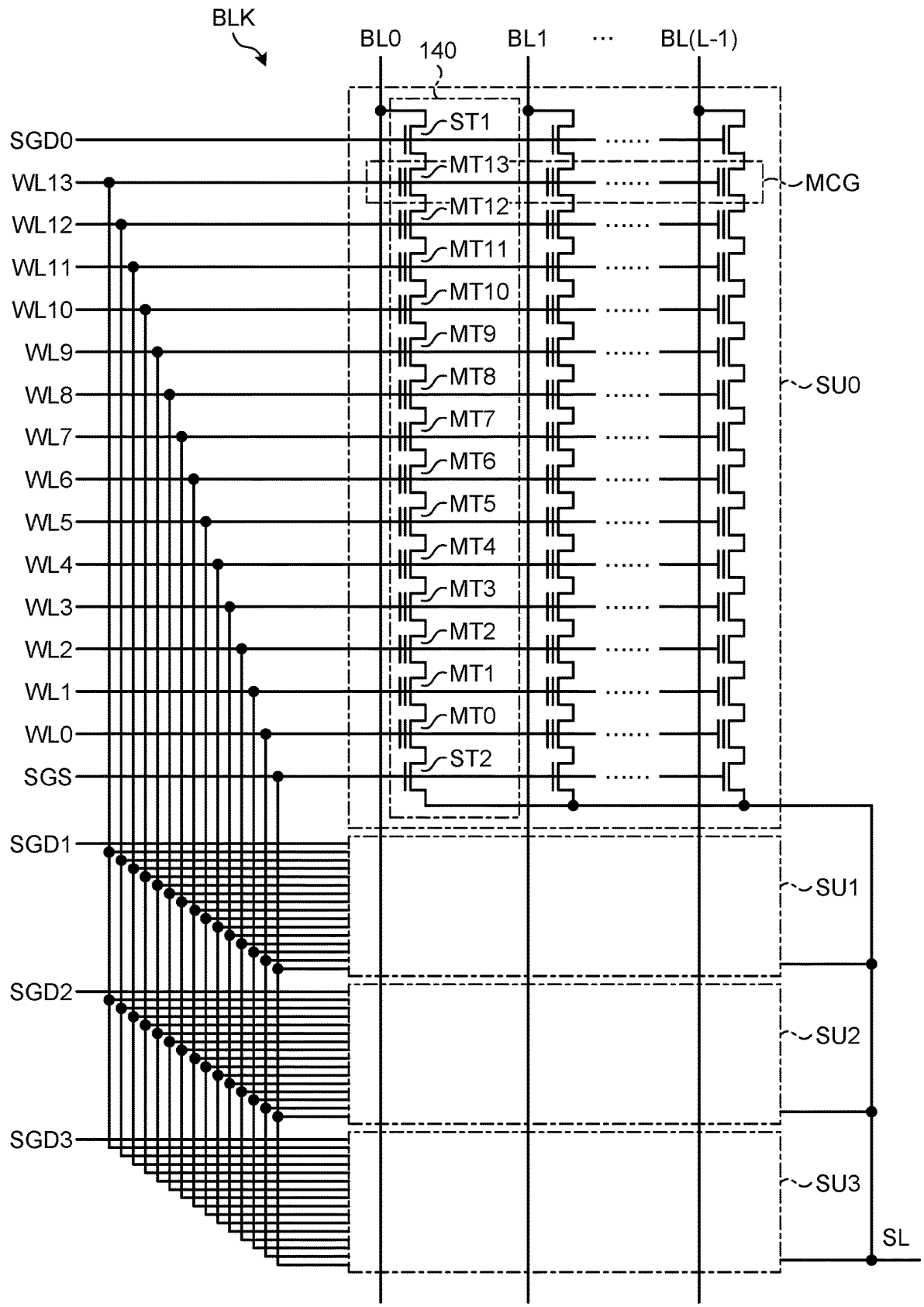
FIG. 3 is a diagram illustrating a circuit configuration of a block of the first embodiment.

FIG. 3 is a diagram illustrating a circuit configuration of the block BLK of the first embodiment. The blocks BLK each have the same configuration. Each block BLK includes, for example, four string units SU0 to SU3. Each string unit SU includes a plurality of NAND strings 140.

Each of the NAND strings 140 includes, for example, fourteen memory cell transistors MT0 to MT13 and two selection transistors ST1 and ST2. The fourteen memory cell transistors MT0 to MT13 are connected in series between the source of the selection transistor ST1 and the drain of the selection transistor ST2. The number of memory cell transistors MT in the NAND string 140 is not limited to fourteen. The memory cell transistor MT includes a control gate and a charge storage layer, and stores data in a non-volatile manner. The memory cell transistor MT may be a metal oxide nitride oxide silicon (MONOS) transistor including an insulating film as the charge storage layer or a floating gate (FG) transistor including a conductive film as the charge storage layer.

In each of the string units SU0 to SU3, the gates of selection transistors ST1 are connected to selection gate lines SGD0 to SGD3, respectively. In each of the string units SU0 to SU3, the gates of selection transistors ST2 are commonly connected to, for example, a selection gate line SGS. In the string units SU0 to SU3, the gates of the selection transistors ST2 may be connected to different selection gate lines SGS0 to SGS3 in each string unit SU. In the same block BLK, the control gates of the memory cell transistors MT0 to MT13 are commonly connected to word lines WL0 to WL13, respectively.

In each string unit SU, the drains of the selection transistors ST1 of each NAND string 140 are connected, respectively, to different bit lines BL0 to BL(L−1) where L is a natural number of two or more. In addition, the bit lines BL are commonly connected to one NAND string 140 in each string unit SU among the blocks BLK. The sources of the selection transistors ST2 are commonly connected to a source line SL.

That is, the string unit SU is a set of NAND strings 140 connected to the different bit lines BL and the same selection gate line SGD. The block BLK is a set of string units SU having the same word line WL. The memory cell array 113 is a set of blocks BLK connected to the same bit line BL.

In response to receipt of a data write instruction from the controller 200, a threshold voltage of the memory cell transistor MT is set to a state associated with data to be stored therein. This operation is referred to as program operation. In response to receipt of a data read instruction from the controller 200, a determination is made as to a state of the threshold voltage of the memory cell transistor MT to convert the determined state into data. This operation is referred to as sense operation.

The memory cell transistors MT connected to one word line WL in one string unit SU are collectively subjected to a program operation and sense operation. A group of memory cell transistors MT collectively selected for the program operation and the sense operation is referred to as a memory cell group MCG. A set of 1-bit memory area of each of the memory cell transistors MT of one memory cell group MCG, which is subjected to the program operation or the sense operation, is referred to as a page. The page is an example of a first storage area.

The number of pages provided by one memory cell group MCG depends on the number of data bits that can be stored in each memory cell transistor MT. If the number of data bits stored in each memory cell transistor MT is N where N is an integer of one or more, one memory cell group MCG can provide N pages.

At the time of erasing the data, all the memory cell transistors MTs in one block BLK are selected. Then, the threshold voltage of each of the selected memory cell transistor MT is set to a state representing that the selected memory cell transistor MT is considered to store initial data. This processing is referred to as erase operation. The erase operation is executed in units of blocks BLK.

Refer back to FIG. 2. The voltage generation circuit 107 generates various voltages required for accessing (program operation, sense operation, and erase operation) the memory cell array 113 in accordance with input power to a Vcc terminal (not illustrated). Then, the voltage generation circuit 107 supplies the generated voltages to each of the sense amplifier 112, the memory cell array 113, and the row address decoder 115.

The row address decoder 115, the column decoder 110, and the sense amplifier 112 access (program operation, sense operation, and erase operation) the memory cell array 113 under the control of the control circuit 103.

For example, in the program operation, the column decoder 110 selects a bit line BL corresponding to the column address stored in the column buffer 109. The control circuit 103 sets the voltage of the selected bit line to zero. The row address decoder 115 selects a word line corresponding to the row address stored in the row address buffer decoder 114. The row address decoder 115 applies a high-voltage pulse generated by the voltage generation circuit 107 to the selected word line. This causes electrons to be injected into the charge storage layer of a memory cell located at the intersection between the selected bit line and the selected word line, which results in increasing the threshold voltage of the memory cell. The control circuit 103 continuously applies the pulse to the row address decoder 115 until the threshold voltage of the memory cell reaches a target state associated with data stored in the data register 111.

In the sense operation, the sense amplifier 112 pre-charges the bit line BL with a voltage Vcc. The row address decoder 115 selects a word line corresponding to the row address stored in the row address buffer decoder 114. The row address decoder 115 applies a given voltage Vread generated by the voltage generation circuit 107 to non-selected word lines. This places the memory cells connected to the non-selected word lines in a conductive state. The row address decoder 115 then sequentially applies different voltages generated by the voltage generation circuit 107 to a selected word line. The applied voltages correspond to a type of the page to be read. The sense amplifier 112 determines a voltage when electric charges stored by the pre-charging flow out to the source line. Thereby, the sense amplifier 112 identifies a state of a target memory cell to obtain data associated with the identified state. The sense amplifier 112 stores the obtained data in the data register 111.

The data stored in the data register 111 is transmitted to the IO buffer 120 of the IO signal processing circuit 101 through a data line. The IO signal processing circuit 101 outputs the data received in the IO buffer 120 to the controller 200.

The data register 111 is an example of a first buffer. The IO buffer 120 is an example of a second buffer.

Hereinafter, the IO signal processing circuit 101, the control circuit 103, the row address decoder 115, and the sense amplifier 112 will be referred to as a circuit 130.

Figure 4:
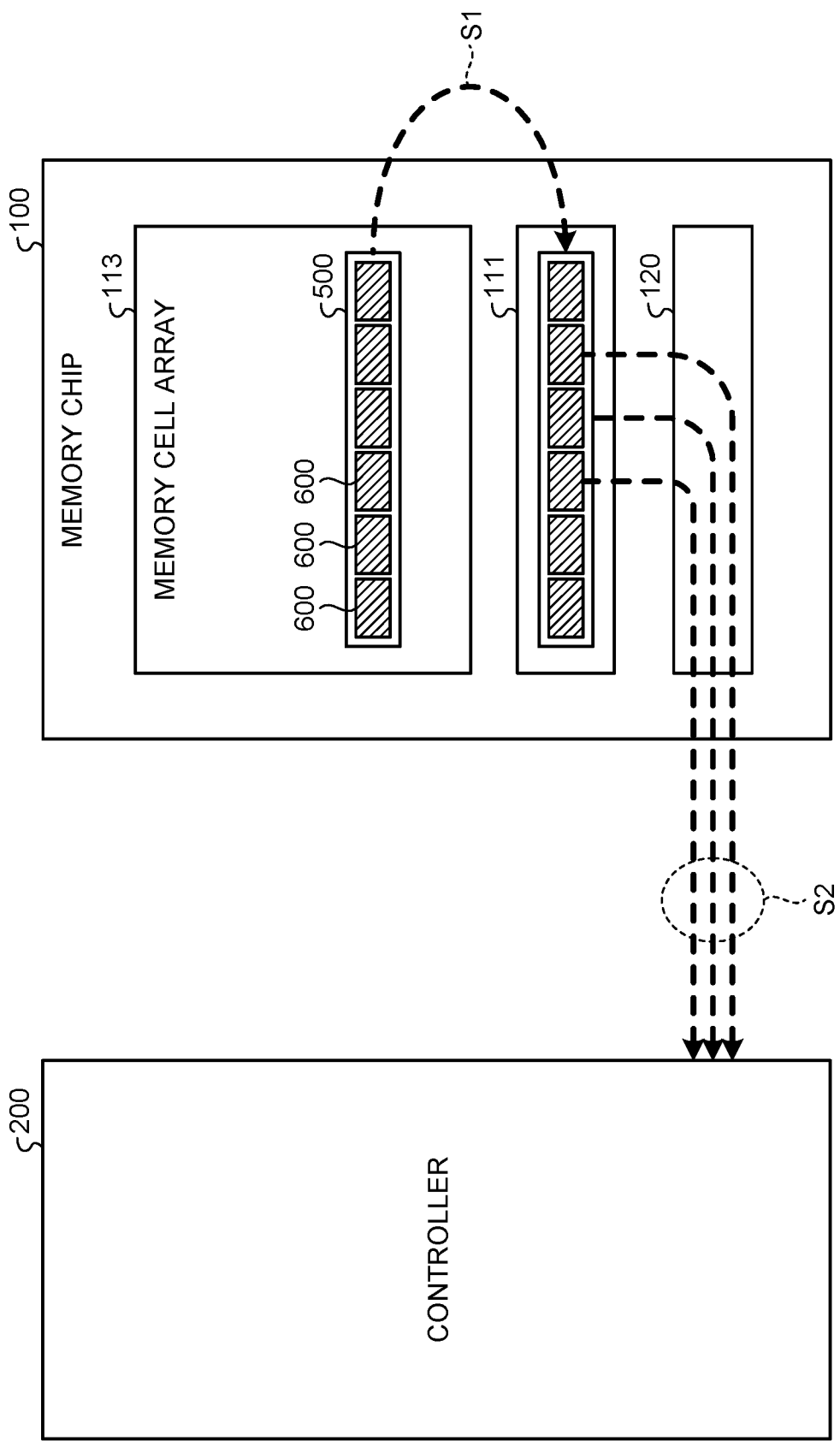
FIG. 4 is a schematic diagram illustrating a data flow from a memory cell array to a controller in the memory system of the first embodiment.

FIG. 4 is a schematic diagram illustrating a data flow from the memory cell array 113 to the controller 200 in the memory system 1 of the first embodiment. First, the circuit 130 reads target data from the memory cell array 113 to the data register 111 by sense operation (S1). In S1, all the pieces of data stored in one page (for example, a page 500 in FIG. 4) are read to the data register 111. The circuit 130 transfers the data from the data register 111 to the controller 200 via the IC buffer 120 (S2). Data output, i.e., data transfer, from the data register 111 to the controller 200 is referred to as data out operation.

The controller 200 can designate data to be subjected to the data out operation in units of cluster smaller than the page (cluster 600 in FIG. 4). The cluster refers to a unit of management of a relationship between a logical address and a physical address. That is, the logical address is associated with the physical address in a unit of cluster.

The logical address represents address information indicating a location in a logical address space that the memory system 1 provides to the host device 300. The physical address represents address information indicating a location in a physical address space provided by the memory cell array 113, and is fixedly associated with a location in the memory cell array 113. For example, the physical address may partially include a column address and a row address. Alternatively, the physical address may be configured such that a column address and a row address can be calculated therefrom through given conversion processing.

The logical address space is divided into storage areas having a given size, that is, clusters. The logical address space is mapped to the physical address space in a unit of cluster. In response to a read request from the host device 300 with a designated logical address value of a certain cluster, the controller 200 converts the logical address value into a physical address value. Thereby, the controller 200 identifies a read target cluster in the physical address space to which the logical address value is mapped. The controller 200 designates a page including the identified cluster as a sense target, and causes the memory chip 100 to execute sense operation. The controller 200 then designates the identified cluster as a subject of the data out operation and causes the memory chip 100 to execute the data out operation.

The cluster in the physical address space is an example of a second storage area. Hereinafter, the cluster will refer to a cluster in the physical address space. In addition, the data stored in the cluster and the data read from the cluster will be referred to as cluster data. The cluster data is an example of a data segment.

Each of the bits constituting one page is assigned with a column address that increases in ascending order corresponding to the alignment sequence of bit lines. One page includes a plurality of aligned clusters. A head location of each of the clusters included in one page can be indicated by a column address obtained from a physical location of each cluster. Here, when a first cluster and a second cluster are aligned with no gap, there is no column address value of a bit line of another cluster (third cluster) between a column address value indicating the end of the first cluster and a column address value indicating the head of the second cluster. Alternatively, when the first cluster and the second cluster are aligned with no gap where the first cluster is adjacent to the front of the second cluster, the column address value indicating the head of the second cluster follows the column address value indicating the end of the first cluster.

Figure 5:
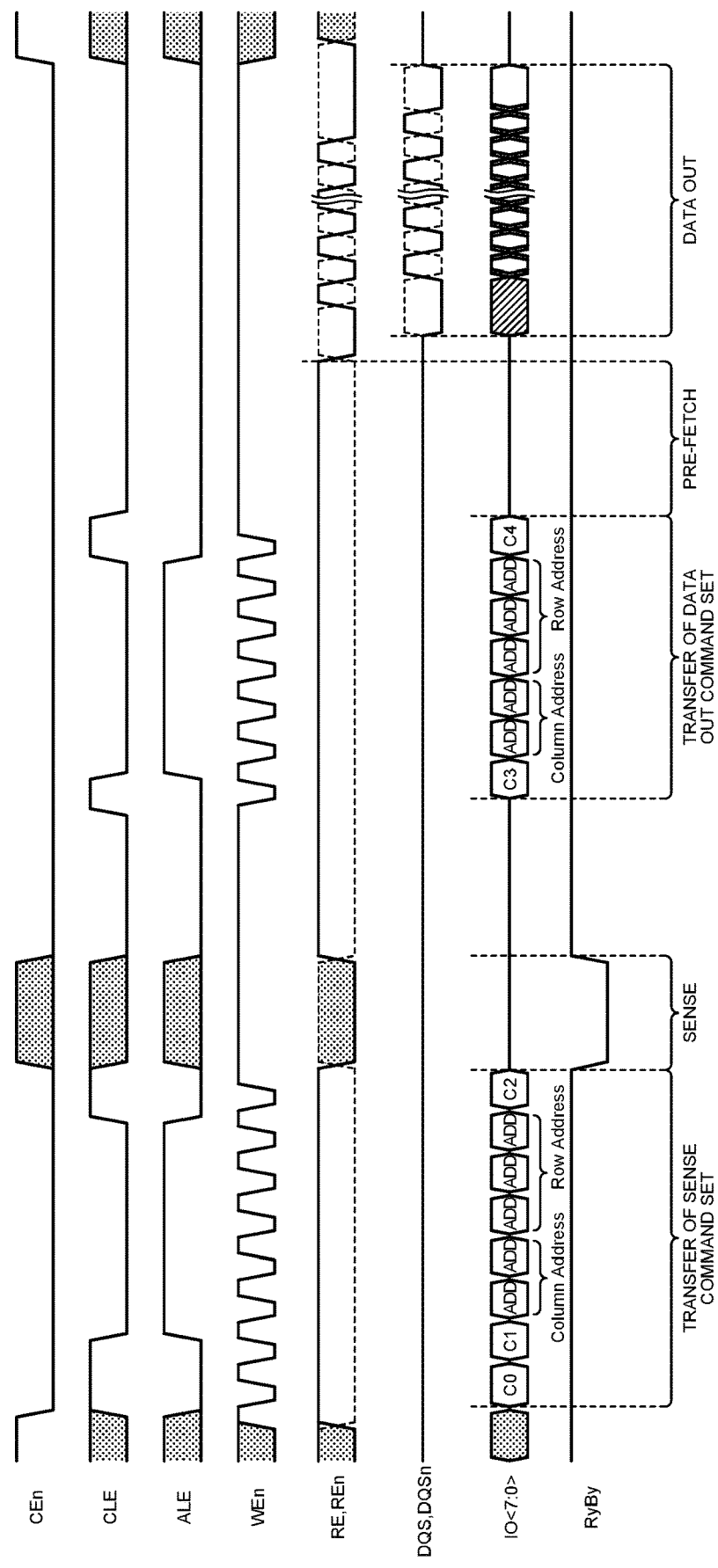
FIG. 5 is a timing chart illustrating a data read operation in the memory system of the first embodiment.

FIG. 5 is a timing chart illustrating details of signals to be transferred between the controller 200 and the memory chip 100 in a data read operation in the memory system 1 of the first embodiment.

The controller 200 first transmits a page designation command C0, a read command C1, address information, and a sense start command C2 in this order. Thereby, the controller 200 gives an instruction as to a target page of sense operation and start of sense operation. A set of the page designation command C0, the read command C1, the address information, and the sense start command C2 is referred to as a sense command set.

In the sense command set, the page designation command C0 serves as designating one or more pages of one memory cell group MCG. The read command C1 indicates that a series of commands is for a read operation. The address information contains a row address indicating a memory cell group MCG that includes a sense target page. The sense target page in a storage area provided by the memory cell array 113 is uniquely designated by a combination of the page designation command C0 and the row address included in the address information. Note that a column address contained in the address information has no specific meaning in the sense command set. The sense start command C2 serves to give a sense start instruction.

The sense command set is transferred as the input/output signal IO<7:0>. The command latch enable signal CLE is maintained at an active level during a transfer period of the commands C0 to C2 of the sense command set. The address latch enable signal ALE is maintained at an active level during a transfer period of the address information in the sense command set. The write enable signal WEn is toggled during a transfer period of the commands C0 to C2 and the address information.

In response to receiving the sense start command C2, the memory chip 100 starts a sense operation. By the sense operation, the circuit 130 reads one-page data from the page uniquely determined by the combination of the page designation command C0 and the row address. The circuit 130 stores the read one-page data in the data register 111.

After the start of the sense operation, the RyBy generation circuit 108 allows the ready busy signal RyBy to transition from the ready state Ry to the busy state By. After the end of the sense operation, the RyBy generation circuit 108 allows the ready busy signal RyBy to transition from the busy state By to the ready state Ry. By monitoring the ready busy signal RyBy after transmitting the sense start command C2, the controller 200 can recognize completion of the sense operation, that is, completion of reading the one-page data from the sense target page to the data register 111.

After the sense operation, the controller 200 may cause the memory chip 100 to execute the data out operation. The controller 200 causes the memory chip 100 to execute the data out operation by transmitting a data out command C3, address information, and a pre-fetch start command C4 in this order.

The data out command C3 is for giving an instruction for the data out operation. The address information includes a column address and a row address. The column address indicates a storage location of target cluster data of the data out operation among the one-page data stored in the data register 111. The row address has the same value as the row address included in the sense command set.

The pre-fetch start command C4 is for giving a pre-fetch start instruction. Data to be subjected to the data out operation is divided in unit of 8-bits and transmitted from the data register 111 to the IO buffer 120, and the IO buffer 120 outputs data having an 8-bit width to the controller 200. A pre-fetch operation refers to a preparation for first 8-bit data of cluster data to be subjected to the data out operation. The circuit 130 starts the pre-fetch operation in response to the pre-fetch start command C4.

The controller 200 starts toggling the read enable signal pair RE and REn after elapse of a time taken for the pre-fetch operation. The time is predefined as a design value. The circuit 130 transfers target data of the data out operation by eight bits from the data register 111 to the IO buffer 120 starting from the leading 8-bit data prepared by the pre-fetch operation, in synchronization with the read enable signal pair RE and REn. Further, the circuit 130 generates the strobe signal pair DQS and DQSn by delaying the read enable signal pair RE and REn. The controller 200 fetches data in the IO buffer 120 at timing in synchronization with the strobe signal pair DQS and DQSn. Thereby, target cluster data of the data out operation is output or transferred from the memory chip 100 to the controller 200 as the input/output signal IO<7:0>. The data out operation is thus executed.

As understood from the description with reference to FIG. 5, the data out operation requires additional processing, i.e., overhead, such as transfer of a data out command set and the pre-fetch operation. To increase a data transfer rate from the memory chip 100 to the controller 200 as much as possible, it is desirable to decrease a ratio of an overhead time to a data out operation time as much as possible. The smaller the ratio of the overhead time to the data out operation time is, the higher the average data transfer rate from the memory chip 100 to the controller 200 is.

A technique will be now described for the sake of comparison with the first embodiment. The technique for comparison with the first embodiment is referred to as a comparative example. According to the comparative example, cluster data is a unit of transfer of a data out command set and a pre-fetch operation. Multiple pieces of cluster data may be read for the data out operation from multiple clusters aligned in a page with no gap. Even in such a case, the transfer of the data out command set and the pre-fetch operation are performed in units of cluster. Thus, according to the comparative example, the ratio of a total overhead time to a total data out operation time is increased, which means a slower data transfer rate.

To the contrary, the memory system 1 of the first embodiment is configured to be able to execute the data out operation of two or more pieces of cluster data by a single data out command set. In other words, the controller 200 can cause the memory chip 100 to output two or more pieces of cluster data in a period after transmission of a data out command set before next transmission of any command set. This can shorten the total overhead time taken for the data out operation of multiple pieces of cluster data as compared with the comparative example. Thereby, the data transfer rate is improved.

A method of transferring data from the memory chip 100 to the controller 200 in the memory system 1 of the first embodiment will be described in detail with reference to FIGS. 6 and 7.

Figure 6:
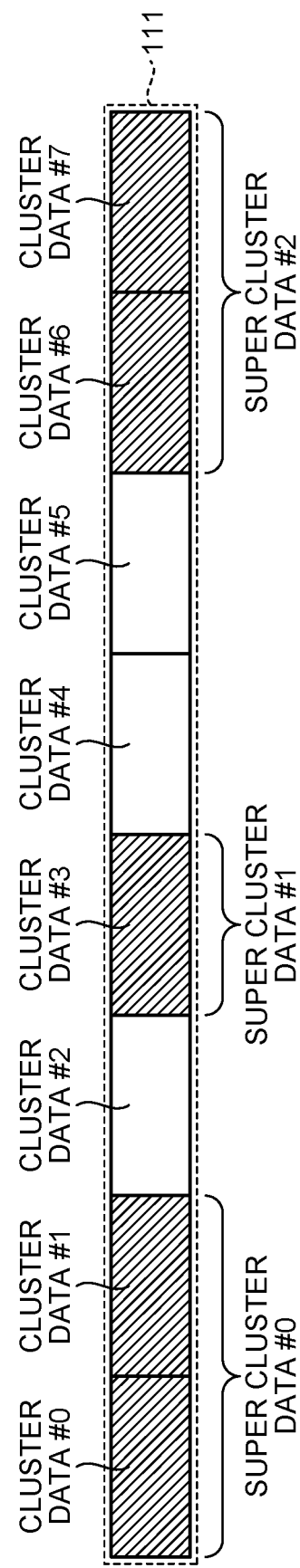
FIG. 6 is a schematic diagram illustrating one-page data stored in a data register in the memory system of the first embodiment.

FIG. 6 is a schematic diagram illustrating one-page data stored in the data register 111 in the memory system 1 of the first embodiment. In the example illustrated in FIG. 6, the one-page data stored in the data register 111 includes eight pieces of cluster data #0 to #7. The eight pieces of cluster data #0 to #7 are read from eight clusters #0 to #7 aligned with no gap. Cluster data #x where x is an integer from zero to seven refers to cluster data read from cluster #x. The eight pieces of cluster data #0 to #7 are stored in the data register 111 in the same alignment order as that in a page from which the cluster data in question has been read.

In the example illustrated in FIG. 6, of the cluster data #0 to #7, the cluster data #0, #1, #3, #6, and #7 are cluster data to be used. The cluster data to be used refers to data for use in some operation by the controller 200 and to be acquired by the controller 200 through the data out operation.

For example, in response to receiving a read request from the host device 300, the controller 200 transmits requested data to the host device 300. For this reason, the controller 200 acquires cluster data including the requested data from the memory chip 100. That is, the cluster data including the requested data by the host device 300 corresponds to the cluster data to be used.

In another example, the controller 200 may perform relocation separately from the read operation requested by the host device 300. The relocation refers to reading data from a certain location in a memory chip 100 and writing the data to the same memory chip 100 where the data has been read or a different memory chip 100. The relocation corresponds to garbage collection, wear leveling, or refreshing, for instance. Of the data stored in the memory chip 100, cluster data being a subject of the relocation corresponds to the cluster data to be used.

In the first embodiment, to use the pieces of cluster data read from multiple clusters aligned with no gap in the page, the controller 200 causes the memory chip 100 to output the pieces of cluster data to be used in one sequence by a single data out command set. In the example illustrated in FIG. 6, the cluster data #0 and the cluster data #1 are transferred in one sequence by a single data out command set, and the cluster data #6 and the cluster data #7 are transferred in one sequence by a single data out command set.

Hereinafter, a cluster data group transferred in one sequence by a single data out command is referred to as super cluster data. The super cluster data may include one piece of cluster data alone. In the example illustrated in FIG.

6, super cluster data #0 includes the cluster data #0 and the cluster data #1, super cluster data #1 includes the cluster data #3, and super cluster data #2 includes the cluster data #6 and the cluster data #7.

Figure 7:
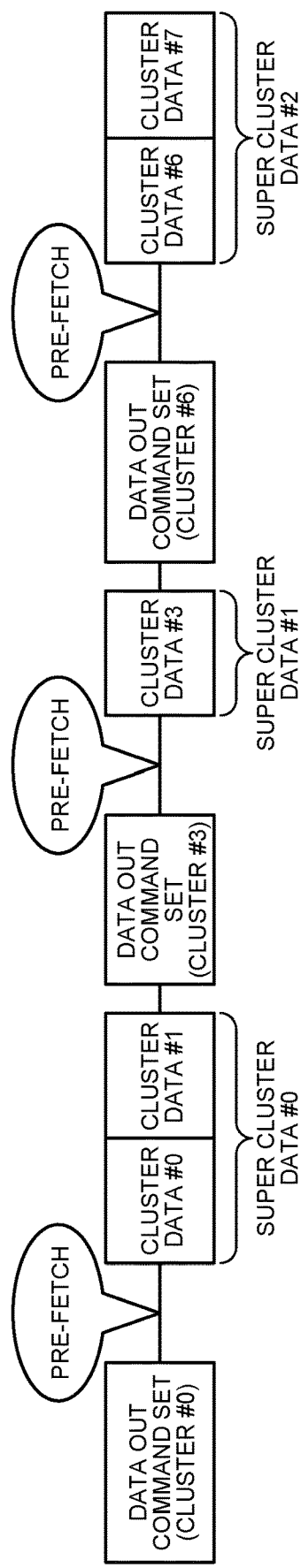
FIG. 7 is a schematic timing chart at the time of transferring cluster data in the memory system of the first embodiment.

FIG. 7 is a schematic timing chart of the input/output signal IO<7:0> at the time of transferring the cluster data illustrated in FIG. 6 in the memory system 1 of the first embodiment.

First, the controller 200 transmits a first data out command set. The first data out command set includes a column address value indicating the head of cluster #0. In other words, address information included in the first data out command set includes the column address value indicating the head of the cluster #0. The memory chip 100 executes a pre-fetch operation for outputting the cluster #0, in accordance with the first data out command set. Then, the memory chip 100 consecutively outputs the cluster data #0 and the cluster data #1 of the super cluster data #0 in response to the toggling of the read enable signal pair RE and REn.

The controller 200 controls a size of data output from the memory chip 100 by the number of toggles of the read enable signal pair RE and REn. The cluster data #1 is stored in the data register 111 subsequent to the cluster data #0, therefore, the pre-fetch operation for outputting the cluster data #1 is concealed in the case of consecutively outputting the cluster data #0 and the cluster data #1. Thereby, the controller 200 toggles the read enable signal pair RE and REn by the number of times corresponding to the total size of the cluster data #0 and the cluster data #1. The memory chip 100 transfers data having a size corresponding to the number of toggles of the read enable signal pair RE and REn after the pre-fetch operation, from the data register 111 to the IO buffer 120. Thereby, the memory chip 100 can consecutively output the cluster data #0 and the cluster data #1.

After completion of the output of the super cluster data #0, the controller 200 processes the cluster data #3 that is the super cluster data #1. Specifically, the controller 200 transmits a second data out command set. The second data out command set includes a physical address value of the cluster #3. The memory chip 100 executes a pre-fetch operation for outputting the cluster data #3 in accordance with the second data out command set. After completion of the pre-fetch operation for the output of the cluster data #3, the controller 200 toggles the read enable signal pair RE and REn by the number of times corresponding to the size of the cluster data #3. The memory chip 100 transfers data having a size corresponding to the number of toggles of the read enable signal pair RE and REn after the pre-fetch operation, from the data register 111 to the IC buffer 120. Thereby, the memory chip 100 can output the cluster data #3.

After completion of the output of the super cluster data #1 (cluster data #3), the controller 200 processes the cluster data #6 and the cluster data #7 of the super cluster data #2. To this end, the controller 200 transmits a third data out command set. The third data out command set includes a physical address value of the cluster #6. The memory chip 100 executes a pre-fetch operation for outputting the cluster data #6 in accordance with the third data out command set. After completion of the pre-fetch operation for the output of the cluster data #6, the controller 200 toggles the read enable signal pair RE and REn by the number of times corresponding to the total size of the cluster data #6 and the cluster data #7. The memory chip 100 transfers data having a size corresponding to the number of toggles of the read enable signal pair RE and REn after the pre-fetch operation, from the data register 111 to the IC buffer 120. Thereby, the memory chip 100 can consecutively output the cluster data #6 and the cluster data #7.

FIG. 16 is a schematic timing chart of the input/output signal IO<7:0> at the time of transferring the cluster data illustrated in FIG. 6 according to the comparative example. In the case of the comparative example, as illustrated in FIG. 16, transfer of a data out command set and a pre-fetch operation are both executed five times for transferring cluster data #0, #1, #3, #6, and #7 to be used.

To the contrary, according to the first embodiment, as described above with reference to FIG. 7, the transfer of the data out command set and the pre-fetch operation are performed only three times. According to the first embodiment, thus, it is possible to shorten the overhead time for transferring the cluster data #0, #1, #3, #6, and #7 to be used as compared with the comparative example. This can improve the average data transfer rate, i.e., the data transfer rate.

Figure 8:
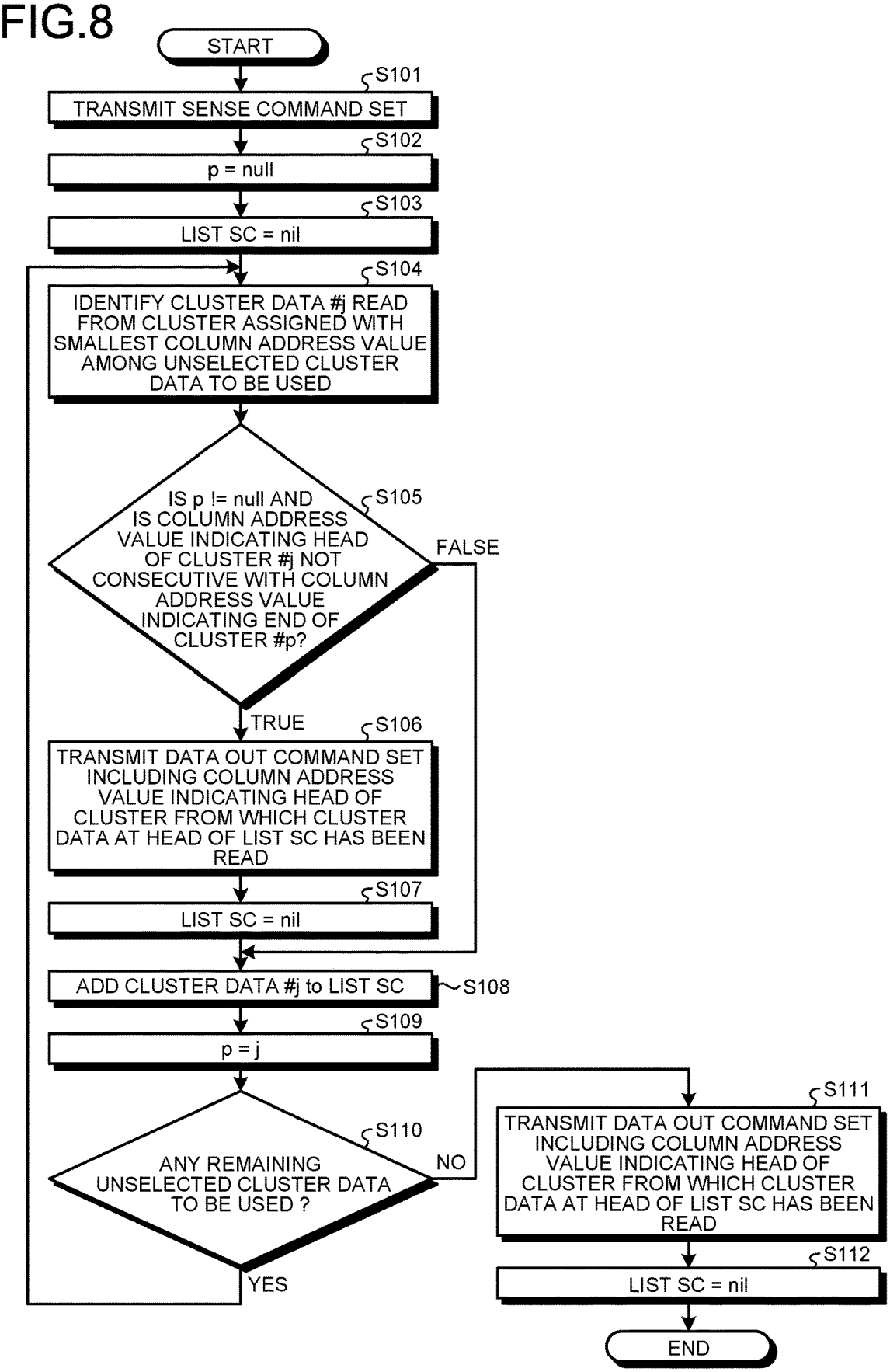
FIG. 8 is a flowchart illustrating an exemplary operation of a controller of the first embodiment.

FIG. 8 is a flowchart illustrating an exemplary operation of the controller 200 of the first embodiment.

First, the controller 200 transmits a sense command set to the memory chip 100 (S101). In response to reception of the sense command set, the memory chip 100 reads one-page data from the memory cell array 113 to the data register 111.

As described above, the data register 111 stores pieces of cluster data in an alignment order corresponding to that in a page from which the cluster data has been transferred. In the data register 111, head cluster data is referred to as cluster data #0, and cluster data stored at a (y+1)-th location from the head is referred to as cluster data #y. The cluster from which the cluster data #y has been read is referred to as cluster #y.

After S101, the controller 200 resets a variable p to a null (S102) and places a list SC in a free state, that is, nil (S103).

In the list SC, a group of cluster data is registered. The registration of cluster data in the list SC signifies selection of cluster data as the cluster data to constitute one piece of super cluster data. The variable p represents cluster data lastly added to the list SC.

The controller 200 identifies cluster data read from a cluster assigned with the smallest column address value, among unselected cluster data to be used in the one-page data stored in the data register 111 (S104). The identified cluster data is denoted by cluster data #j using a variable j.

The controller 200 determines whether a determination condition is satisfied that the variable p is not a null and the column address value of the head of cluster #j is not consecutive with a column address value of the end of cluster #p (S105). That is, the controller 200 determines whether the cluster #j is aligned behind the cluster #p without a gap. When the determination condition is satisfied at S105 (TRUE at S105), the controller 200 transmits, to the memory chip 100, a data out command set including a column address value indicating the head of a cluster from which the head cluster data in the list SC has been read (S106). Then, the controller 200 places the list SC in a free state (S107).

When the determination condition is not satisfied at S105 (FALSE at S105), the controller 200 skips the processing of S106 and S107.

After S107 or when the determination condition is not satisfied at S105 (FALSE at S105), the controller 200 adds the cluster data #j to the list SC (S108). Then, the controller 200 substitutes a value of the variable j for the variable p (S109).

Subsequently, the controller 200 determines whether there remains unselected cluster data to be used (S110). With any unselected cluster data to be used found (Yes at S110), the controller 200 proceeds to the processing at S104.

With no unselected cluster data to be used found (No at S110), the controller 200 transmits a data out command set including the column address value indicating the head of the cluster from which the head cluster data in the list SC has been read (S111). Then, the controller 200 places the list SC in a free state (S112), ending the processing.

In the description of the example of FIG. 8, the processing at and after S102 is executed after transmission of the sense command set. The order of transmission timing of the sense command set and execution timing of processing at and after S102 is not limited to such an example.

For example, the controller 200 may have a command queue in the NAND interface circuit 205. In this case, the controller 200 sequentially enqueues commands addressed to the memory chip 100 into the command queue, and the NAND interface circuit 205 sequentially transmits one or more commands from the command queue to the memory chip 100. For example, the controller 200 first enqueues the sense command set into the command queue, and then executes the processing at and after S102. The controller 200 further enqueues the data out command set into the command queue at S106 and S112. By such an operation by the controller 200, timing at which the sense command set is transmitted from the command queue may delay from execution timing for the processing at and after S102. Even in such a case, however, the sense command set and the data out command set are transmitted in the same order as that by the series of processing illustrated in FIG. 8.

As described above, according to the first embodiment, the controller 200 causes the circuit 130, by one data out command set, to output two or more pieces of cluster data read from two or more clusters aligned with no gap, among the pieces of cluster data stored in the data register 111. In other words, the controller 200 causes the circuit 130 to output the two or more pieces of cluster data during a period after the transmission of the data out command set before the transmission of a next command set.

Thus, the controller 200 can decrease the ratio of the total overhead time to the total data out operation time from that of the comparative example, thereby improving the data transfer time.

In addition, according to the first embodiment, the controller 200 allows cluster data to be used, read from the clusters aligned with no gap in a page, to be included in a super cluster.

Thereby, the controller 200 can generate one piece of super cluster data including one or more pieces of cluster data.

The first embodiment has described the example of controlling the data size output by the memory chip 100 by the number of toggles of the read enable signal pair RE and REn. A controlling method of the data size output by the memory chip 100 is not limited thereto. The controller 200 may add size information to the data out command set, and the circuit 130 of the memory chip 100 may determine the size of the data output from the memory chip 100 in accordance with the size information.

Second Embodiment

In the first embodiment, one piece of super cluster data includes cluster data to be used alone. In a second embodiment, one piece of super cluster data may include cluster data to be unused, in other words, unwanted cluster data. More specifically, when one or more pieces of cluster data not to be used are read from one or more clusters aligned with no gap in a page and the number thereof is less than a given threshold, the one or more pieces of cluster data are selected as cluster data to constitute one piece of super cluster data.

In the following, it is assumed that the threshold is set to two. In addition, the number of one or more pieces of cluster data not to be used, read from one or more clusters aligned with no gap, is referred to as the number of pieces of consecutive unwanted data.

The following will describe different features from those of the first embodiment. The same or like features as in the first embodiment will be briefly described or a description thereof will be omitted.

Figure 9:
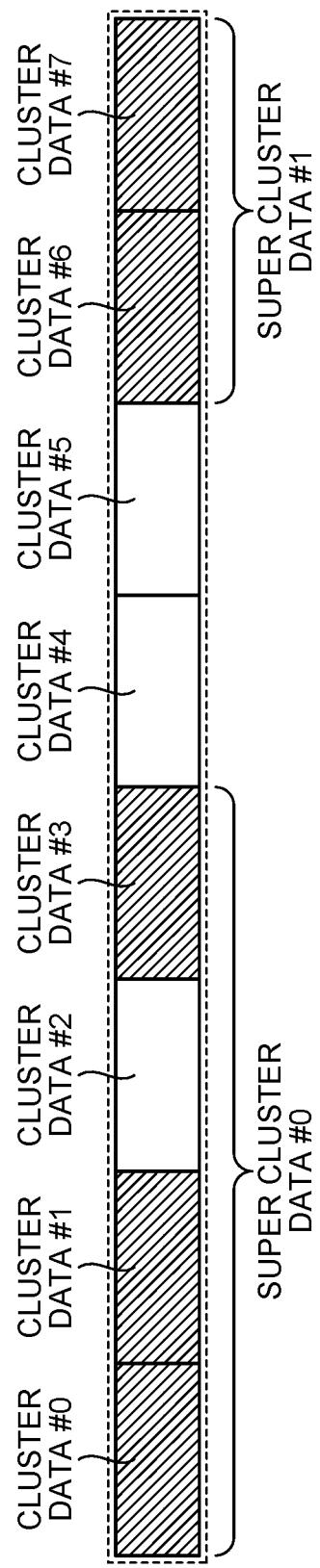
FIG. 9 is a schematic diagram illustrating an exemplary configuration of super cluster data in a memory system of a second embodiment.

FIG. 9 is a schematic diagram illustrating an exemplary configuration of super cluster data in a memory system 1 of the second embodiment.

As in the example illustrated in FIG. 6, among cluster data #0 to #7 being one-page data stored in the data register 111, cluster data #0, #1, #3, #6, and #7 are to be used.

The cluster data #2 corresponds to cluster data not to be used. The cluster data #1 read from cluster #1 aligned ahead of cluster #2 without a gap is to be used. The cluster data #3 read from cluster #3 aligned behind cluster #2 without a gap is to be used. Thus, the number of pieces of consecutive unwanted data (i.e., the cluster data #2) is one. The number of pieces of consecutive unwanted data is smaller than the threshold of two, so that the cluster data #2 together with the cluster data #0, the cluster data #1 and the cluster data #3 are selected as components of one piece of super cluster data (i.e., super cluster data #0).

The cluster data #4 and the cluster data #5 correspond to cluster data not to be used, read from cluster #4 and cluster #5 aligned with no gap, respectively. The cluster data #3 read from the cluster #3 aligned ahead of the cluster #4 with no gap is to be used. The cluster data #6 read from the cluster #5 aligned behind cluster #6 with no gap is also to be used. Thus, the number of pieces of consecutive unwanted data (i.e., the cluster data #4 and the cluster data #5) is two. The number of pieces of consecutive unwanted data is not smaller than the threshold of two, and thus the cluster data #4 and the cluster data #5 are both unselected to constitute the super cluster data.

By the above method, the super cluster data #0 is constituted of the cluster data #0, #1, #2, and #3, and super cluster data #1 is constituted of the cluster data #6 and #7.

Figure 10:
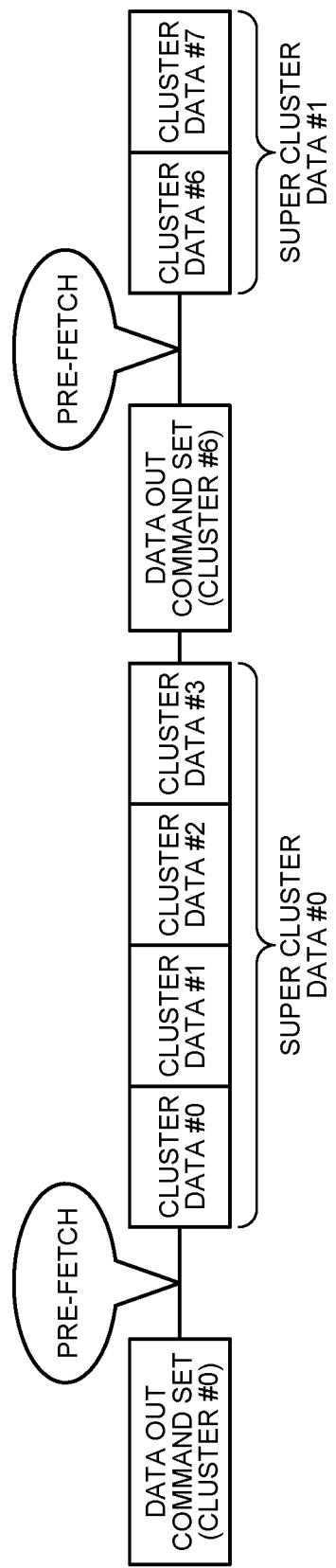
FIG. 10 is a schematic timing chart at the time of transferring cluster data in the memory system of the second embodiment.

FIG. 10 is a schematic timing chart of the input/output signal IO<7:0> at the time of transferring the cluster data illustrated in FIG. 9 in the memory system 1 of the second embodiment.

First, the controller 200 transmits a first data out command set to cause the memory chip 100 to output the cluster data #0, #1, #2, and #3 of the super cluster data #0. The first data out command set includes a column address value indicating the head of cluster #0. The memory chip 100 executes a pre-fetch operation to output the cluster #0, in accordance with the first data out command set. After completion of the pre-fetch operation to output the cluster #0, the controller 200 toggles the read enable signal pair RE and REn by the number of times corresponding to the total size of the cluster data #0, #1, #2, and #3. The circuit 130 of the memory chip 100 transfers data having a size corresponding to the number of toggles of the read enable signal pair RE and REn after the pre-fetch operation, from the data register 111 to the IO buffer 120. Thereby, the memory chip 100 can consecutively output the cluster data #0, #1, #2, and #3.

After completing the output of the super cluster data #0 (the cluster data #0, #1, #2, and #3), the cluster data #6 and the cluster data #7 of the super cluster data #1 are transferred. Thus, the controller 200 transmits a second data out command set. The second data out command set includes a column address value indicating the head of cluster #6. The memory chip 100 executes a pre-fetch operation to output the cluster data #6 in accordance with the second data out command set. After completion of the pre-fetch operation for the output of the cluster #6, the controller 200 toggles the read enable signal pair RE and REn by the number of times corresponding to the total size of the cluster data #6 and the cluster data #7. The circuit 130 of the memory chip 100 transfers data having a size corresponding to the number of toggles of the read enable signal pair RE and REn after the pre-fetch operation, from the data register 111 to the IC buffer 120. Thereby, the memory chip 100 can consecutively output the cluster data #6 and the cluster data #7.

As described above, in the example illustrated in FIGS. 9 and 10, although the unwanted cluster data #2 is transferred, the transfer of the data out command set and the pre-fetch operation are performed only twice.

The threshold may be set in accordance with a result of comparison between time ta and time tb. Time ta represents a processing time for data out operation to one cluster data. Time tb represents a total time taken for transfer of a single data out command set and a single pre-fetch operation.

For example, the designer may set a threshold to a value T satisfying T*ta<tb, which makes a time taken for transferring unwanted cluster data shorter than a time taken for a required overhead (that is, transfer of the data out command set and the pre-fetch operation) for not transferring unwanted cluster data. This results in further improvement in the average data transfer rate from the first embodiment.

A method of determining the threshold is not limited thereto. The designer may set the threshold by any method.

Figure 11:
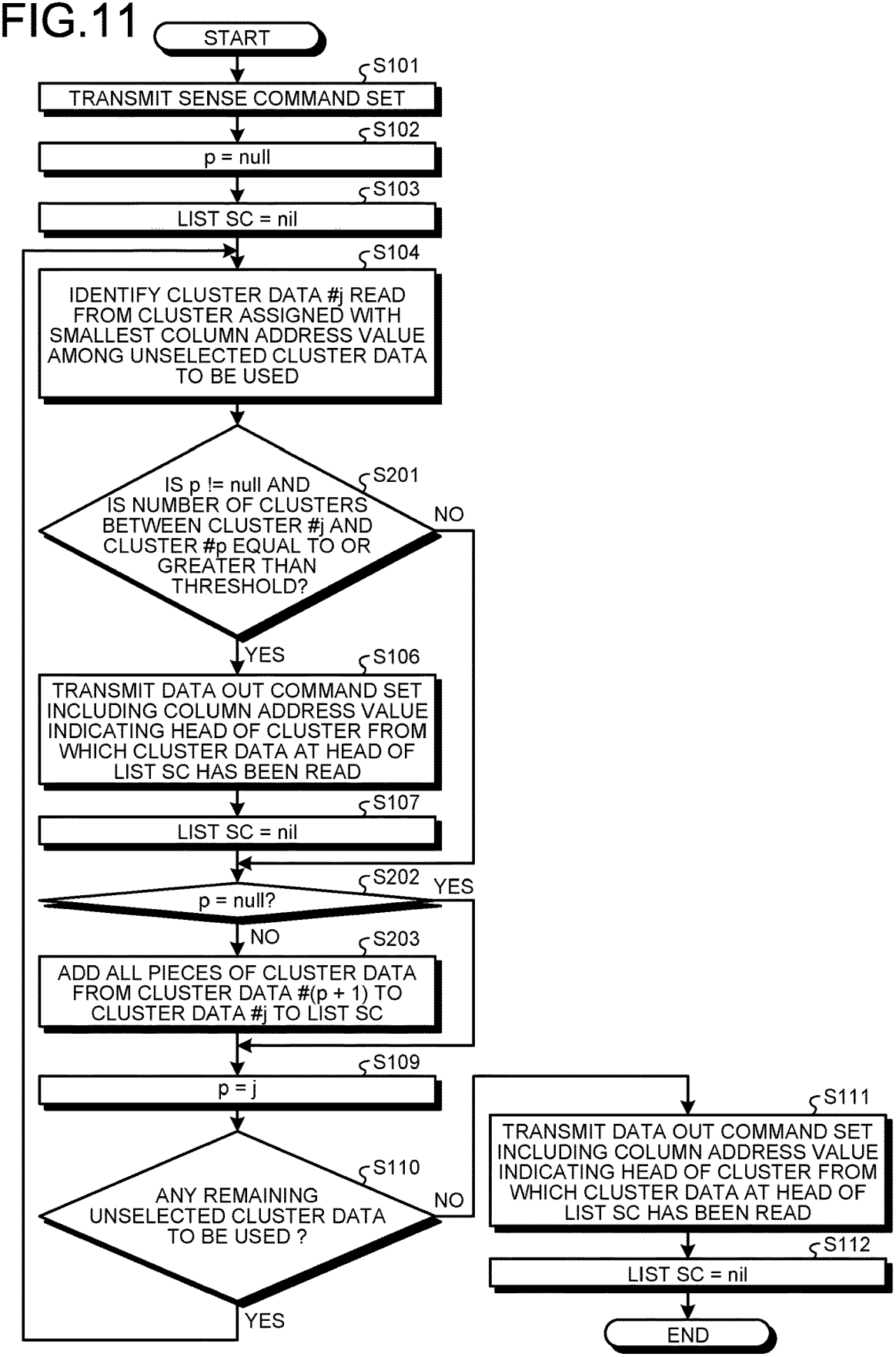
FIG. 11 is a flowchart illustrating an exemplary operation of a controller of the second embodiment.

FIG. 11 is a flowchart illustrating an exemplary operation of the controller 200 of the second embodiment.

In the second embodiment, the controller 200 executes operation of S201 instead of the operation of S105 and executes operation of S202 and S203 instead of the operation of S108 in the processing of the first embodiment described with reference to FIG. 8.

In S201, the controller 200 determines whether a determination condition is satisfied that the variable p is a null and the number of clusters located between cluster #j and cluster #p is equal to or greater than a threshold. The number of clusters located between the cluster #j and the cluster #p corresponds to the number of pieces of consecutive unwanted data. When the determination condition is satisfied at S201 (Yes at S201), the controller 200 transmits a data out command set including a column address value indicating the head of a cluster from which the head cluster data in the list SC has been read (S106).

After S107 or when the determination condition is not satisfied at S201 (No at S201), the controller 200 determines whether the variable p is a null (S202). After determining that the variable p is not a null (No at S202), the controller 200 adds all the pieces of cluster data #(p+1) to #j to the list SC (S203). Thus, there may be a cluster, from which cluster data not to be used has been read, between the cluster #j and the cluster #p, however, in such a case the cluster data not to be used is added to the list SC as long as the number of pieces of consecutive unwanted data is smaller than the threshold. In the case of #j matching (p+1), the controller 200 adds only the cluster data #j to the list SC at S203.

When the variable p is a null (Yes at S202), the controller 200 skips the processing at S203.

According to the second embodiment as described above, after determining that the number of one or more pieces of cluster data not to be used, which are read from one or more clusters aligned with no gap in a page, is smaller than a given threshold, the controller 200 selects the one or more pieces of cluster data as cluster data to constitute one piece of super cluster data.

Thereby, it is possible to shorten the total overhead time and improve the data transfer time.

Third Embodiment

In a third embodiment, in a data out command set, super cluster data to be a subject of data out operation is designated by a pair of address information and size information. Further, the data out command set may include multiple pairs of address information and size information. In the third embodiment, such a data out command set is referred to as an extended data out command set.

Figure 12:
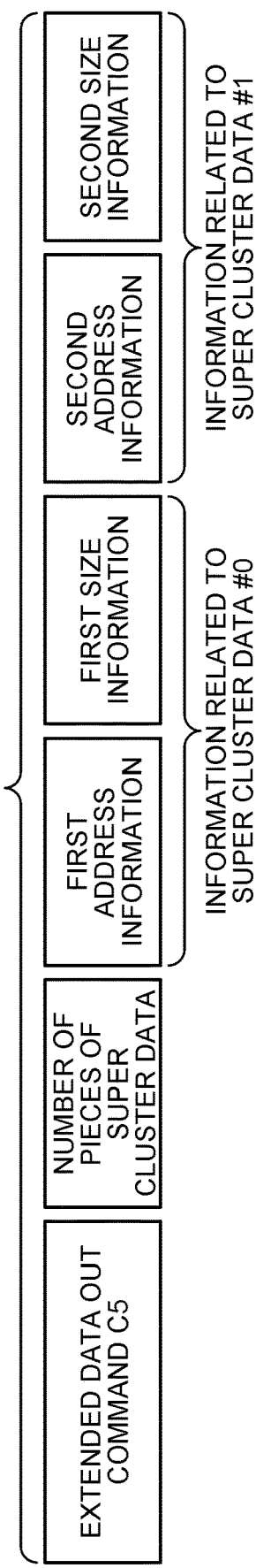
FIG. 12 is a schematic diagram illustrating an exemplary configuration of an extended data out command set of a third embodiment.

FIG. 12 is a schematic diagram illustrating an exemplary configuration of the extended data out command set of the third embodiment. The extended data out command set includes an extended data out command C5, the number of pieces of super cluster data, and one or more pairs of address information and size information. FIG. 12 illustrates a pair of first address information and first size information, and a pair of second address information and second size information by way of example.

The first address information is related to a cluster from which head cluster data of super cluster data #0 has been read, and includes a column address value indicating the head of the cluster. The first size information represents a value of size of the super cluster data #0. The second address information is related to a cluster from which head cluster data of super cluster data #1 has been read, and includes a column address value indicating the head of the cluster. The second size information represents a value of size of the super cluster data #1. That is, the extended data out command set illustrated in FIG. 12 serves to give an instruction for data out operation to the super cluster data #0 and the super cluster data #1.

Each piece of super cluster data, set to a subject of data out operation by the extended data out command set, may include one or more pieces of cluster data. The extended data out command set may include only one pair of address information and size information. The extended data out command set may include three or more pairs of address information and size information.

The number of pieces of super cluster data included in the extended data out command set represents the number of pairs of address information and size information sent in the extended data out command set. That is, in the example of FIG. 12, the number of pieces of super cluster data is set to two.

In response to receipt of the extended data out command set, the memory chip 100 can output each piece of super cluster data designated by the extended data out command set from the data register 111 to the controller 200 via the IO buffer 120 in a pipeline manner.

Figure 13:
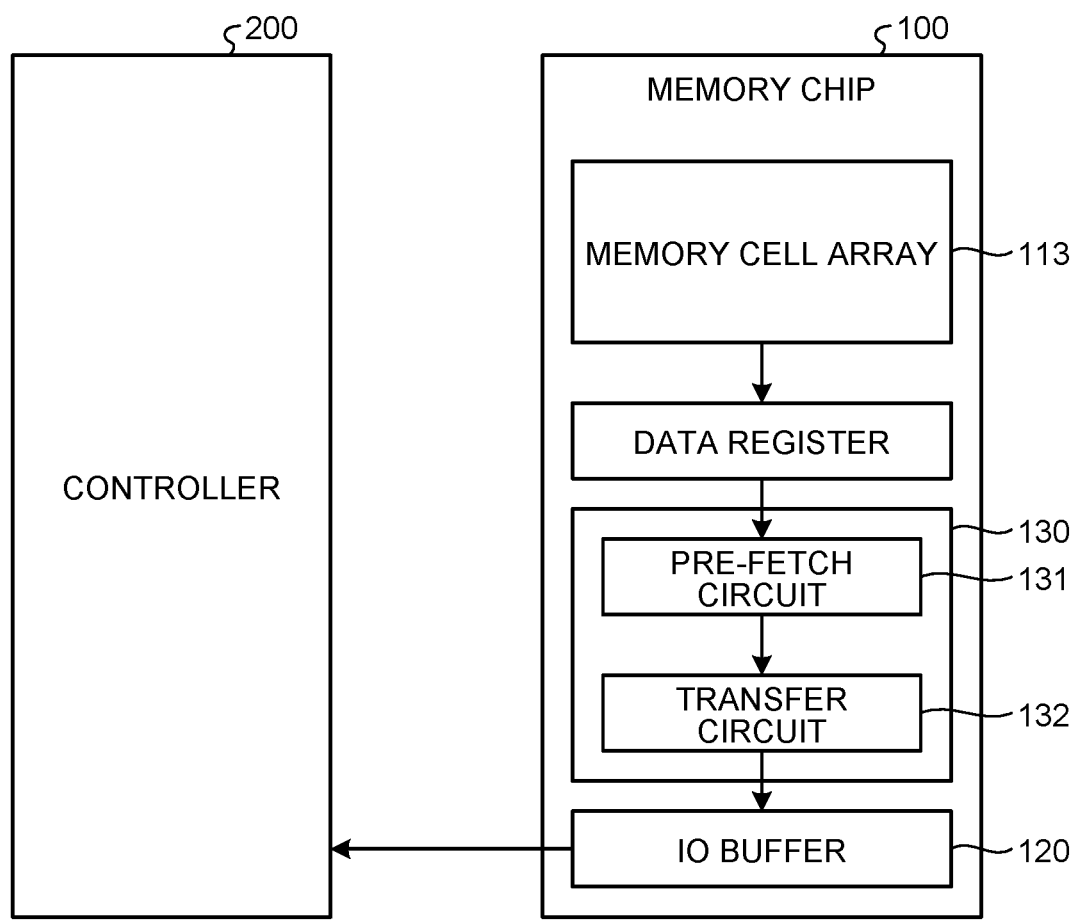
FIG. 13 is a schematic diagram illustrating an exemplary configuration of a memory chip of the third embodiment.

FIG. 13 is a schematic diagram illustrating an exemplary configuration of a memory chip 100 of the third embodiment. As illustrated in FIG. 13, a circuit 130 of the memory chip 100 includes a pre-fetch circuit 131 and a transfer circuit 132. The pre-fetch circuit 131 serves to execute a pre-fetch operation. The transfer circuit 132 serves to transfer data from the data register 111 to the IO buffer 120 in order, starting from 8-bit data prepared by the pre-fetch circuit 131. Further, the transfer circuit 132 toggles the strobe signal pair DQS and DQSn to cause the controller 200 to fetch the data transferred to the IO buffer 120. The data transfer from the data register 111 to the IO buffer 120 and the toggling operation to the strobe signal pair DQS and DQSn are collectively referred to as transfer operation.

The pre-fetch circuit 131 and the transfer circuit 132 are operable in parallel, i.e., at the same time. The memory chip 100 can cause the pre-fetch circuit 131 to perform a pre-fetch operation of one piece of super cluster data and the transfer circuit 132 to perform a transfer operation of another super cluster data in parallel or concurrently.

Figure 14:
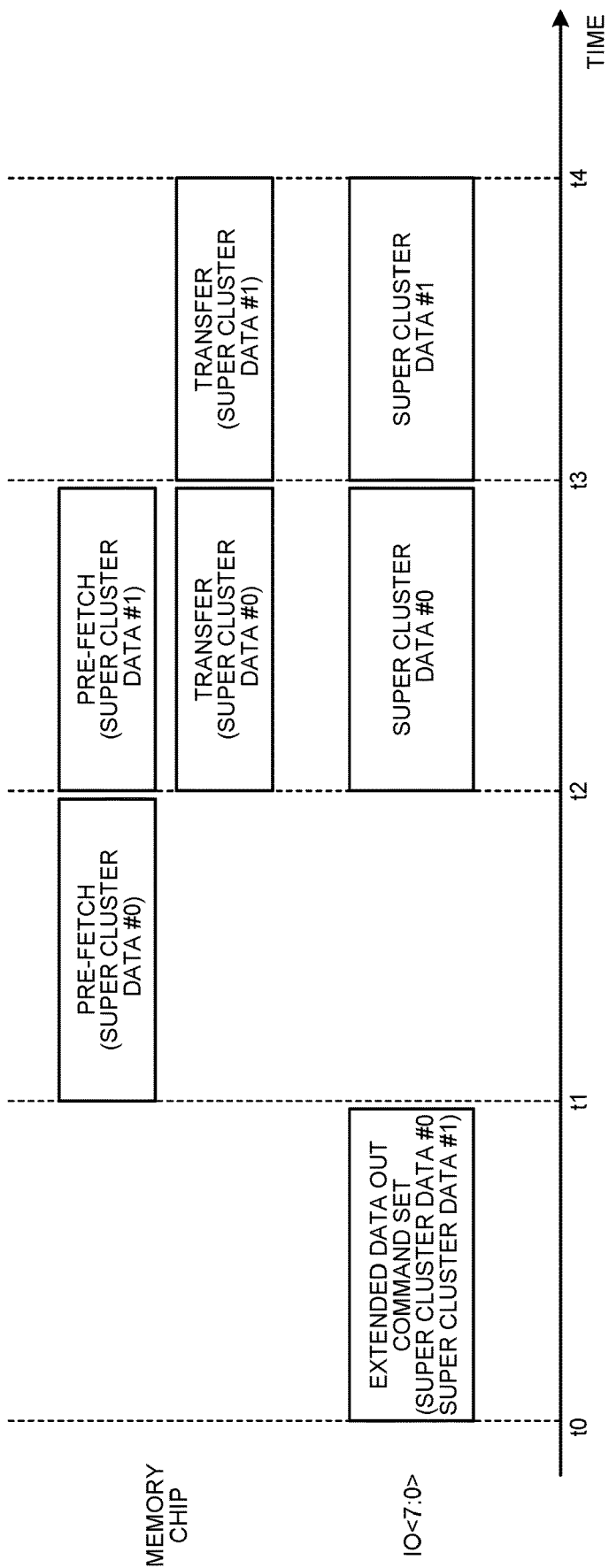
FIG. 14 is a schematic diagram illustrating an operation by the memory chip in response to the extended data out command set in the third embodiment.

FIG. 14 is a schematic diagram illustrating an operation by the memory chip 100 in accordance with the extended data out command set and details of an input/output signal IO<7:0> in the third embodiment. In FIG. 14, a horizontal axis indicates a time.

In the example of FIG. 14, at time t0, the controller 200 transmits, to the memory chip 100, as the input/output signal IO<7:0>, an extended data out command set for giving a data out instruction for super cluster data #0 and super cluster data #1.

In the memory chip 100, in response to receipt of the extended data out command set described above, the circuit 130 may execute a data out operation to either the super cluster data #0 or the super cluster data #1 first. Herein, the extended data out command set contains information on the super cluster data #0 (a pair of address information and size information) and information on the super cluster data #1 (a pair of address information and size information) in this order. The circuit 130 executes the data out operation in the order of the super cluster data included in the extended data out command set, that is, in the order of the super cluster data #0 and the super cluster data #1.

In the memory chip 100, in response to receipt of the extended data out command set, the pre-fetch circuit 131 first starts a pre-fetch operation to output the super cluster data #0 (at time t1). More specifically, the pre-fetch circuit 131 starts the pre-fetch operation to output head cluster data of the super cluster data #0.

After the pre-fetch circuit 131 completes the pre-fetch operation to output the super cluster data #0, the transfer circuit 132 starts a transfer operation of the super cluster data #0 (at time t2). In the transfer of the super cluster data #0, the transfer circuit 132 transfers an amount of data designated by the size information of the super cluster data #0, among the data stored in the data register 111, from the data register 111 to the IO buffer 120 in order, starting from the data prepared by the pre-fetch operation. At the same time, the transfer circuit 132 toggles the strobe signal pair DQS and DQSn by the number of times corresponding to the size of the super cluster data #0, that is, a value given by the size information. Thereby, the super cluster data #0 is output from the memory chip 100 to the controller 200. Thus, the data out operation of the super cluster data #0 is executed.

Concurrently with the transfer circuit 132's start of the transfer operation of the super cluster data #0, the pre-fetch circuit 131 starts a pre-fetch operation to output the super cluster data #1 (at time t2). More specifically, the pre-fetch circuit 131 starts the pre-fetch operation to output head cluster data of the super cluster data #1.

After completion of the transfer operation of the super cluster data #0 and the pre-fetch operation to output the super cluster data #1, the transfer circuit 132 starts a transfer operation of the super cluster data #1 (at time t3). The transfer circuit 132 performs the transfer operation of the super cluster data #1 in the same manner as of the super cluster data #0. Thereby, the super cluster data #1 is output from the memory chip 100 to the controller 200. That is, the data out operation of the super cluster data #1 is executed.

The transfer of the super cluster data #1 is then completed, completing the processing of the extended data out command (at time t4).

As described above, the circuit 130 executes the pre-fetch operation of the super cluster data #1 and the transfer operation of the super cluster data #0 in parallel. This makes it possible to conceal a time taken for the pre-fetch operation of the super cluster data #1 even if the super cluster #0 and the super cluster #1 are spaced apart from each other in the page. That is, owing to a decrease in the overhead time, the circuit 130 can improve in the average data transfer rate as compared with being given instructions for the data out operation of the super cluster data #0 and the super cluster data #1 by different data out command sets. Note that the expression "a first cluster (or super cluster) and a second cluster (super cluster) are spaced apart from each other" means that another cluster (or super cluster) is located between the first cluster (or super cluster) and the second cluster (or super cluster).

Figure 15:
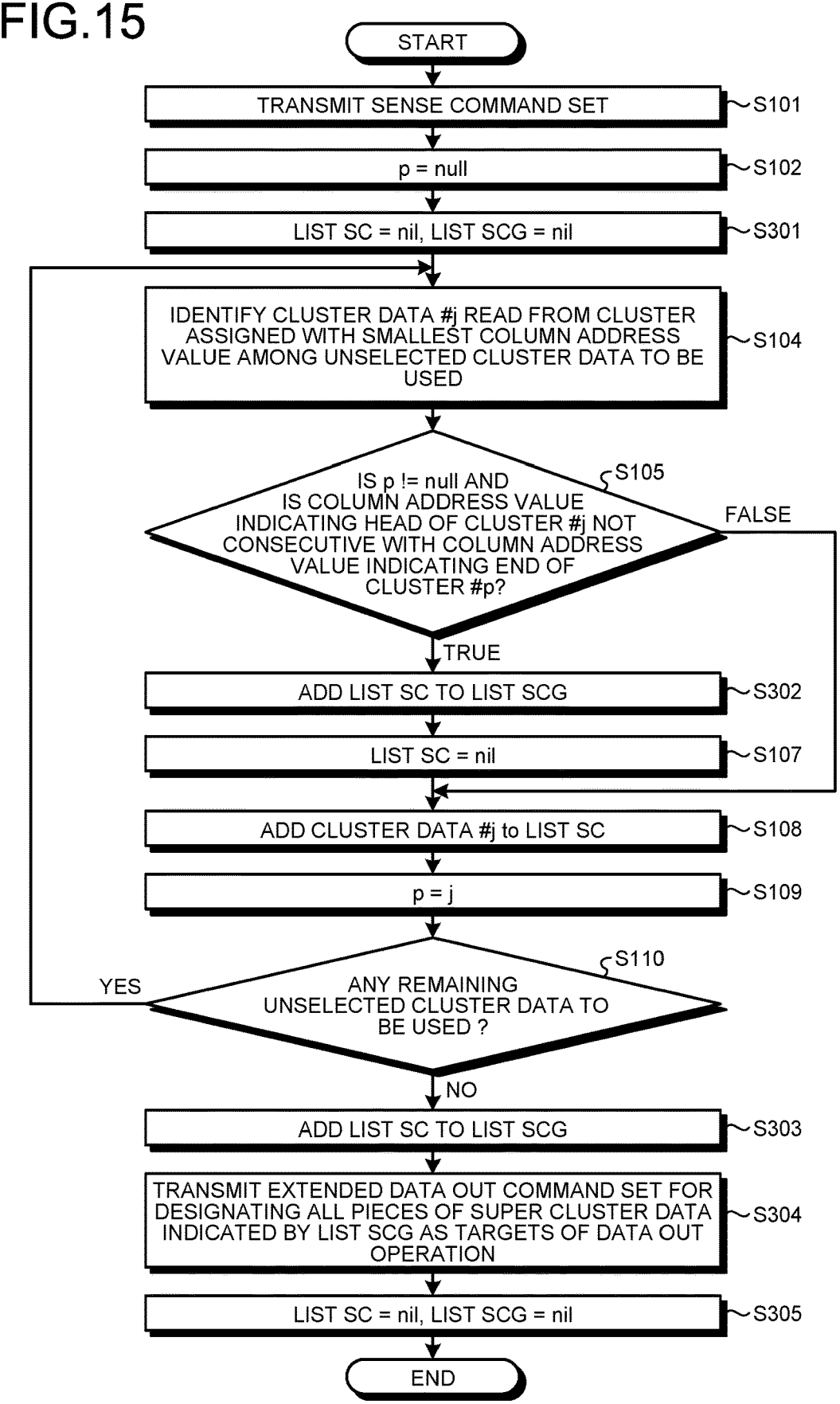
FIG. 15 is a flowchart illustrating an exemplary operation of a controller of the third embodiment.

FIG. 15 is a flowchart illustrating an exemplary operation of the controller 200 of the third embodiment. An operation of the controller 200 according to the third embodiment in combination with the first embodiment will be described by way of example. The third embodiment may also be combined with the second embodiment.

The controller 200 performs processing at S101 and S102 as in the first embodiment. The controller 200 places a list SC and a list SCG in a free state, that is, nil (S301).

The list SCG lists a group of super cluster data selected as a subject of data out operation by one extended data out command set. The list SC can be registered in the list SCG.

Subsequently, the controller 200 performs processing at S104 and S105 as in the first embodiment. When the determination condition is satisfied at S105 (TRUE at S105), the controller 200 adds the list SC to the list SCG (S302). During the free state of the list SC, nothing is added to the list SCG at S302.

Subsequently, the controller 200 places the list SC in a free state (S107).

After S107 or when the determination condition is not satisfied at S105 (FALSE at S105), the controller 200 performs the same processing at S108 to S110, as in the first embodiment.

After determining at S110 that there remains no unselected cluster data to be used (No at S110), the controller 200 adds the list SC to the list SCG (S303). Then, the controller 200 transmits an extended data out command set for designating all the pieces of super cluster data contained in the list SCG to be the subject of the data out operation (S304). With any unselected cluster data to be used found, (Yes at S110), the controller 200 returns to S104.

After S304, the controller 200 places the list SC and the list SCG in a free state (S305), ending the processing.

As described above, according to the third embodiment, the circuit 130 executes a pre-fetch operation of one piece of super cluster data, that is, preparing for transfer (or output) of a head portion of the one piece of super cluster data, and transferring (or outputting) of another super cluster in parallel. This makes it possible to conceal a time taken for the pre-fetch operation of the one piece of super cluster data.

Thereby, the circuit 130 can improve in the average data transfer rate, as compared with being given instructions separately for outputting the one piece of super cluster data and another super cluster data by different data out command sets.

The average data transfer rate can be improved as long as the pre-fetch operation of one piece of super cluster data and the output of another super cluster partially overlap each other temporally.

Moreover, in the third embodiment, the extended data out command set includes one or more pairs of address information and size information. One or more pieces of cluster data, read from one or more clusters aligned with no gap, are collectively designated by each pair of address information and size information. The controller 200 can cause the circuit 130 to output one or more pieces of super cluster data each including one or more pieces of cluster data before transmission of a next command set, using such an extended data out command set.

As described above, each super cluster data transferred by the extended data out command set includes one or more pieces of cluster data. The extended data out command set may be configured to individually designate multiple pieces of cluster data. In such a case, the controller 200 sequentially selects the cluster data to be used and sequentially adds the selected cluster data to the list SCG. Then, with no remaining unselected cluster data to be used found, the controller 200 executes the processing at S303.

The third embodiment has described the example that two operations are executed in a pipeline manner inside the memory chip 100. However, the third embodiment is also applicable to execution of internal processing of the memory chip 100 and processing outside the memory chip 100 in a pipeline manner. For example, an interface chip may be placed between the memory chip 100 and the controller 200. In such a case, a pre-fetch operation in the memory chip 100 and internal processing of the interface chip can be executed in a pipeline manner.

As mentioned in the first to third embodiments, the data out command set or the extended data out command includes at least one physical address value. The controller 200 transmits the data out command set or the extended data out command to the memory chip 100 after one-page data is stored in the data register 111. In a period after the transmission of the data out command set or the extended data out command before transmission of any next command set, the controller 200 causes the circuit 130 to output cluster data, read from a cluster assigned with a physical address value included in the data out command set or the extended data out command, and cluster data, read from a cluster assigned with a different physical address value.

Thereby, it is possible to decrease the ratio of the total overhead time to the total data out operation time as compared with the comparative example, resulting in improving the data transfer rate.

While certain embodiments have been described, these embodiments have been presented by way of example only, and are not intended to limit the scope of the inventions. Indeed, the novel methods and systems described herein may be embodied in different other forms; furthermore, various omissions, substitutions and varies in the form of the methods and systems described herein may be made without departing from the spirit of the inventions. The accompanying claims and their equivalents are intended to cover such forms or modifications as would fall within the scope and spirit of the inventions.

What is claimed is:

1. A memory system comprising:
a memory chip including a memory cell array, a first buffer, and a circuitry;
the memory cell array including a first storage area that includes a plurality of second storage areas aligned with no gap,
the circuitry being configured to read data from the memory cell array to the first buffer in a unit of the first storage area; and
a controller configured to:
manage a relationship between a logical address and a physical address in a unit of the second storage area, the logical address being associated with data, the physical address indicating a location in the memory chip in which the data is stored, and
in a case where first data is read from the first storage area to the first buffer, the first data having been stored in the first storage area and including a plurality of first data segments respectively having been stored in the plurality of second storage areas of the first storage area, transmit, to the memory chip, a first command set that includes first location information indicating a head of a third storage area, the third storage area being one of the plurality of second storage areas, wherein
the circuitry is further configured to, in a period after the controller transmits the first command set to the memory chip before the controller transmits a second command set next to the first command set to the memory chip, output, to the controller,
a second data segment, the second data segment being one of the plurality of first data segments and having been stored in the third storage area, and
a third data segment, the third data segment being one of the plurality of first data segments and having been stored in a fourth storage area, the fourth storage area being one of the plurality of second storage areas and different from the third storage area.

2. The memory system according to claim 1, wherein
the circuitry is further configured to, in the period after the controller transmits the first command set to the memory chip before the controller transmits the second command set to the memory chip, output one or more fourth data segments to the controller,
the one or more fourth data segments being one or more of the plurality of first data segments and having been stored in one or more fifth storage areas, the one or more fifth storage areas being one or more of the plurality of second storage areas and different from the third storage area and the fourth storage area.

3. The memory system according to claim 2, wherein
a group of the one or more fifth storage areas is consecutively aligned with an end of the third storage area, and
the fourth storage area is consecutively aligned with an end of the group.

4. The memory system according to claim 3, wherein
the controller is configured to request the circuitry to, when the one or more fourth data segments are to be used, output the second data segment, the one or more fourth data segments, and the third data segment by the first command set.

5. The memory system according to claim 1, wherein
the fourth storage area is spaced apart from the third storage area, and
the first command set further includes location information of a head of the fourth storage area.

6. The memory system according to claim 1, wherein
the circuitry is configured to output the second data segment and prepare for outputting a head portion of the third data segment in an at least partially, temporally overlapping manner.

7. The memory system according to claim 2, wherein
the one or more fifth storage areas are aligned with each other with no gap,
the first command set further includes
  second location information indicating a head of a group of the one or more fifth storage areas, and
  size information indicating a total size of the one or more fifth storage areas, and
the circuitry is further configured to output the one or more fourth data segments to the controller in accordance with the second location information and the size information.

8. The memory system according to claim 3, wherein
the controller is configured to request the circuitry to, when the one or more fourth data segments are not to be used and the number of the one or more fourth data segments is smaller than a threshold, output the second data segment, the one or more fourth data segments, and the third data segment by the first command set.

9. The memory system according to claim 8, wherein
the threshold is determined so that a time required for transferring the one or more fourth data segments, which are not to be used, is shorter than an overhead time for preparing for outputting a head portion of the third data segment.

10. The memory system according to claim 9, wherein
the memory chip further includes an input/output buffer, wherein
the preparing includes at least transferring, from the first buffer to the input/output buffer, the head portion of the third data having a bit width same as a bit width for outputting the third data from the input/output buffer.

11. A method of controlling a nonvolatile memory, the nonvolatile memory including a memory cell array, a first buffer, and a circuitry, the memory cell array including a first storage area that includes a plurality of second storage areas aligned with no gap, the circuitry being configured to read data from the memory cell array to the first buffer in a unit of the first storage area, said method comprising:
  managing a relationship between a logical address and a physical address in a unit of the second storage area, the logical address being associated with data, the physical address indicating a location in the nonvolatile memory in which the data is stored;
  requesting the circuitry to read first data from the first storage area to the first buffer, the first data having been stored in the first storage area and including a plurality of first data segments respectively having been stored in the plurality of second storage areas of the first storage area;
  transmitting, to the nonvolatile memory, a first command set that includes first location information indicating a head of a third storage area, the third storage area being one of the plurality of second storage areas, wherein
  the circuitry is configured to, in a period after receiving the first command set before receiving a second command set next to the first command set, output,
    a second data segment, the second data segment being one of the plurality of first data segments and having been stored in the third storage area, and
    a third data segment, the third data segment being one of the plurality of first data segments and having been stored in a fourth storage area, the fourth storage area being one of the plurality of second storage areas and different from the third storage area.

12. The method according to claim 11, wherein
the circuitry is further configured to, in the period after receiving the first command set before receiving the second command set, output one or more fourth data segments,
the one or more fourth data segments being one or more of the plurality of first data segments and having been stored in one or more fifth storage areas, the one or more fifth storage areas being one or more of the plurality of second storage areas and different from the third storage area and the fourth storage area.

13. The method according to claim 12, wherein
a group of the one or more fifth storage areas is consecutively aligned with an end of the third storage area, and
the fourth storage area is consecutively aligned with an end of the group.

14. The method according to claim 13, further comprising:
requesting the circuitry to, when the one or more fourth data segments are to be used, output the second data segment, the one or more fourth data segments, and the third data segment by the first command set.

15. The method according to claim 11, wherein
the fourth storage area is spaced apart from the third storage area, and
the first command set further includes location information of a head of the fourth storage area.

16. The method according to claim 11, wherein
the circuitry is configured to output the second data segment and prepare for outputting a head portion of the third data segment in an at least partially, temporally overlapping manner.

17. The method according to claim 12, wherein
the one or more fifth storage areas are aligned with each other with no gap,
the first command set further includes
  second location information indicating a head of a group of the one or more fifth storage areas, and
  size information indicating a total size of the one or more fifth storage areas, and
the circuitry is further configured to output the one or more fourth data segments in accordance with the second location information and the size information.

18. The method according to claim 13, further comprising:
requesting the circuitry to, when the one or more fourth data segments are not to be used and the number of the one or more fourth data segments is smaller than a threshold, output the second data segment, the one or more fourth data segments, and the third data segment by the first command set.

19. The method according to claim 18, wherein
the threshold is determined so that a time required for transferring the one or more fourth data segments, which are not to be used, is shorter than an overhead time for preparing for outputting a head portion of the third data segment.

20. The method according to claim 19, wherein
the nonvolatile memory further includes an input/output buffer, wherein
the preparing includes at least transferring, from the first buffer to the input/output buffer, the head portion of the third data having a bit width same as a bit width for outputting the third data from the input/output buffer.

* * * * *